Sept. 18, 1934.   K. TAMUSSINO   1,974,371

SWIVELING MEANS FOR THE HEADLIGHTS OF VEHICLES

Filed July 8, 1933

K. Tamussino
INVENTOR

By: Marks & Clark
Attys.

Patented Sept. 18, 1934

1,974,371

UNITED STATES PATENT OFFICE 1,974,371

SWIVELING MEANS FOR THE HEADLIGHTS OF VEHICLES

Karl Tamussino, Mödling, near Vienna, Austria

Application July 8, 1933, Serial No. 679,569
In Austria July 8, 1932

1 Claim. (Cl. 240—62)

Application has been filed in Austria July 8, 1932.

This invention relates to improved swiveling means in conjunction with the headlights of power-driven vehicles, for the purpose of deflecting the beam of one of the headlights when the vehicle is traveling in a curve. Swiveling devices for this purpose are already known in which, when the vehicle is traveling in a curve, means actuated in mechanical dependence on the steering gear become operative to swivel the headlight on the inner side of the curve while the other headlight remains motionless with its beam directed straight ahead. In the known arrangements of this type the actuating mechanism consists essentially of pull wires of the Bowden type, and the end pulleys are so arranged that the pull wire for the headlight not swiveled at any one time becomes unwound from its pulley and hangs slack. Such slack wire, however, is a source of danger, more particularly when parts of the steering gear or brake system operate in the vicinity of this wire.

The present invention relates to swiveling means for headlights having a pull wire associated with each headlight, and in which the above described drawback is obviated by the arrangement, between the steering gear and the two pull wires, of a control device which is adapted to be operated by the steering gear, and which is so constructed that when the swiveling mechanism is actuated the pull wire for the headlight on the outside of the curve (which is not swiveled) is not slackened off but remains entirely uninfluenced.

A constructional example of the embodiment of the invention is illustrated in the accompanying drawing, in which.

Figure 1:
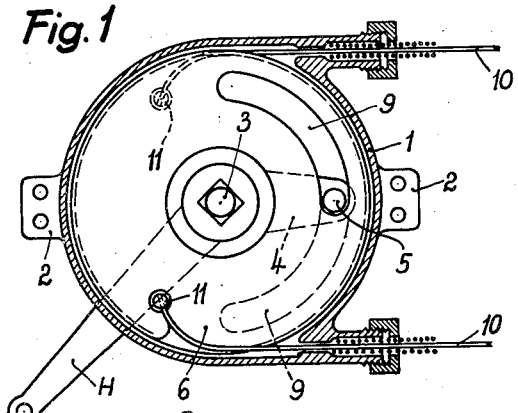
Figs. 1 and 2 show the control box, in section on two different planes.
Figure 2:
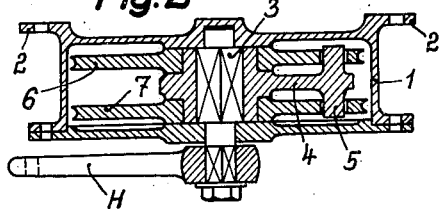

Referring to Figs. 1 and 2, the control box shown in these figures is designed for attachment to the axle or to the chassis of the vehicle, the lever H, which is the actuating lever for the entire swiveling mechanism, being connected by suitable means either to the axle trunnion distancing bar or to the connecting bar of the steering gear, so that each oscillating movement of the steering gear is automatically transmitted to the lever H of the control box.

The control box consists of a casing 1 which is provided with lugs 2 for the attachment of the box to the vehicle. Centrally in this casing there is mounted a shaft 3 having a square section middle portion on which there is mounted a lever 4 carrying a pin 5. On the bosses formed on each side of this lever 4 there are rotatably mounted the driving discs 6 and 7. Both discs are provided with arcuate slots 9 in which the double pin 5 is free to move. On their periphery these discs are provided with a groove for the reception of Bowden pull wires 10 which are fastened at one end at 11 to their respective discs, and of which the one actuates the left-hand and the other the right-hand headlight.

On the movement of the lever H, which is effected positively to one side or the other by the steering gear, the lever 4 is likewise moved, and rotates either the disc 6 or the disc 7 through the intermediary of the two-sided pin 5.

By the rotary movement of the driving disc either the one or the other of the pull wires is retracted, the movement of the corresponding headlight being thereby effected.

Figure 3:
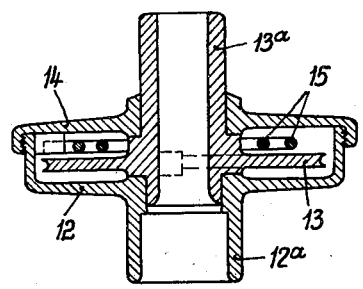
Figs. 3 and 4 show the swiveling box, likewise in two different sectional views.
Figure 4:
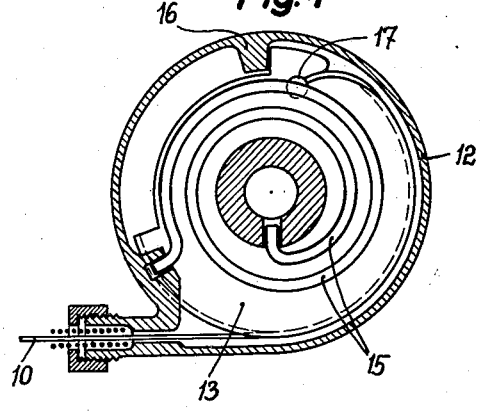
Figure 5:
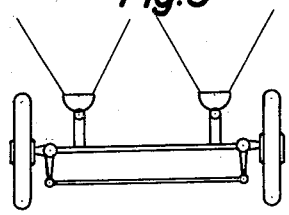
Figs. 5 to 7 represent diagrammatically the respective headlight settings for straight travel, cornering to the right, and cornering to the left.
Figure 6:
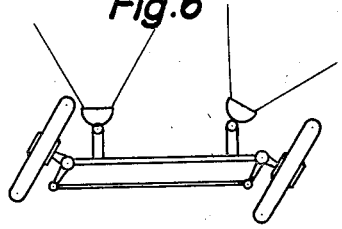
Figure 7:
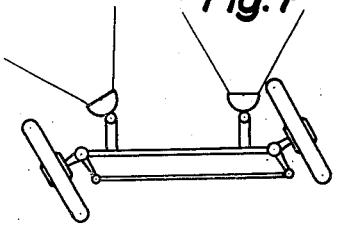

The swiveling box (Figs. 3 and 4) consists of a flat casing 12 which is fitted, by means of an extension 12ª, to the pivot or spindle of the headlight carrier and clamped or otherwise held fast thereon. Rotatably mounted in this casing there is a pulley 13 having a projecting tubular portion 13ª for the attachment of the headlight proper. The box is closed by the cover 14 which is screwed to the casing, and which also serves to provide the bearing for the tubular portion 13ª. A spring 15, which is secured by one end to the pulley 13 and by the other end to the casing 12, causes the disc to be pressed against the nose 16 on the casing of the box, and thus retains the headlight steadily in one position. The end of the appropriate Bowden pull wire 10 is coiled upon the pulley 13 and attached thereto at 17.

When one of the pull wires 10 is drawn into the control box by the described mechanism, this wire is unwound from the pulley 13 in the swiveling box, and the headlight mounted on the latter is rotated against the action of the spring 15. When this wire is released, the tensioned spring 15 rewinds the same and returns the headlight into its original position.

Since during the movement of the lever H the pin 5 travels idly in the slot in one or the other of the discs, so that only one disc is carried round thereby, only one of the pull wires will be drawn at any one time, and only one of the headlights, namely that on the inner side of the curve, will be swiveled.

Without departing from the scope of the invention it is also possible to provide a locking device by means of which, for example, the automatic headlight movement can be rendered inoperative by day.

I claim:

Means for swiveling the headlights of vehicles, comprising two preferably flat swiveling boxes, each adapted for rotatably mounting one headlight of the vehicle, a pulley, rotatably mounted in each swiveling box and coupled with the corresponding headlight, a preferably flat control box, two coaxial driving discs, rotatably mounted in this control box independently from one another, a driving member actuated by the steering device of the vehicle, mounted coaxially to and rotatably between the driving discs, a coupling pin on the driving member and slots in both driving discs, displaced with respect to the coupling pin, so that the driving member in each sense of rotation can actuate only one of the driving discs, and two Bowden pull wires, each fixed with one end to a driving disc, and with the other end to the pulley of the corresponding headlight.

KARL TAMUSSINO.